United States Patent
Rouvinen (10) Patent No.: US 12,267,354 B2
(45) Date of Patent: Apr. 1, 2025

(54) PROTECTION AGAINST MALICIOUS DATA TRAFFIC

(71) Applicant: AIRO FINLAND OY, Helsinki (FI)

(72) Inventor: Jarmo Tapio Rouvinen, Helsinki (FI)

(73) Assignee: AIRO FINLAND OY, Helsinki (FI)

( * ) Notice: Subject to any disclaimer, the term of this patent is extended or adjusted under 35 U.S.C. 154(b) by 280 days.

(21) Appl. No.: 17/787,222

(22) PCT Filed: Dec. 20, 2019

(86) PCT No.: PCT/FI2019/050919
§ 371 (c)(1),
(2) Date: Jun. 17, 2022

(87) PCT Pub. No.: WO2021/123491
PCT Pub. Date: Jun. 24, 2021

(65) Prior Publication Data
US 2023/0028892 A1     Jan. 26, 2023

(51) Int. Cl.
*G06F 21/32* (2013.01)
*H04L 9/40* (2022.01)

(52) U.S. Cl.
CPC ...... *H04L 63/1441* (2013.01); *H04L 63/1408* (2013.01)

(58) Field of Classification Search
CPC ............. H04L 63/1416; H04L 63/1425; H04L 63/1408; H04L 63/145; H04L 63/1433; H04L 67/02; H04L 63/1441; H04L 61/1511; G06F 21/552; G06F 21/566; G06F 2221/034; G06F 21/562; G06F 21/564; G06F 21/568; G06F 21/56; G06F 21/554; H04W 12/02; H04W 12/009; H04W 12/04; H04W 12/0471; H04W 12/06; H04W 12/122; H04W 12/108; H04W 12/50; H04W 12/71; G06N 3/0454
USPC .......... 726/2, 21, 23, 36; 713/150, 163, 181; 380/255, 264, 276
See application file for complete search history.

(56) References Cited

U.S. PATENT DOCUMENTS

| | | | |
|---|---|---|---|
| 9,756,075 B1 * | 9/2017 | Gopalakrishna | .... H04L 63/1425 |
| 10,869,190 B2 * | 12/2020 | Mondello | ............. H04L 63/061 |
| 11,088,821 B2 * | 8/2021 | Troia | .................... G08G 1/0145 |

(Continued)

FOREIGN PATENT DOCUMENTS

| | | |
|---|---|---|
| EP | 1 691 529 | 8/2006 |
| WO | 2017/196558 | 11/2017 |
| WO | 2018/224720 | 12/2018 |

OTHER PUBLICATIONS

International Search Report and Written Opinion of the ISA for PCT/FI2020/050919, mailed Aug. 7, 2020, 14 pages.

*Primary Examiner* — Sharif E Ullah
(74) *Attorney, Agent, or Firm* — NIXON & VANDERHYE (57) ABSTRACT

Disclosed is a method for defending against a malicious data traffic, the method includes: monitoring, by a defender device, data traffic flowing through a network device; generating a first control signal, by the defender device, in response to a detection that the data traffic includes a predefined amount of malicious data traffic, to cause a delivery of the data traffic to the defender device; terminating the malicious data traffic in the defender device. Also disclosed is an apparatus implementing the method, a computer program product and a system.

16 Claims, 3 Drawing Sheets

(56) References Cited

U.S. PATENT DOCUMENTS

| | | | |
|---|---|---|---|
| 2019/0042779 A1* | 2/2019 | Agerstam | G06F 21/554 |
| 2020/0128067 A1* | 4/2020 | Guim Bernat | G06F 9/44594 |
| 2020/0327231 A1* | 10/2020 | Smith | G06F 21/33 |
| 2024/0106839 A1* | 3/2024 | Smith | H04L 63/1441 |

* cited by examiner

PROTECTION AGAINST MALICIOUS DATA TRAFFIC

This application is the U.S. national phase of International Application No. PCT/FI2019/050919 filed Dec. 20, 2019 which designated the U.S., the entire contents of which is hereby incorporated by reference.

TECHNICAL FIELD

The invention concerns in general the technical field of communication networks. More particularly, the invention concerns a solution for protecting the communication networks against service attacks.

BACKGROUND

Communication in today's world is heavily based on communication networks. The development in the area of the communication networks has been tremendous especially during the past decades. However, the more important the communications networks have become the more attractive targets they are for criminals. One way to disturb data traffic in the communication network is to generate there an amount of malicious data traffic which jams at least in part the communication network and/or network elements implementing operations enabling the data traffic in the communication network.

The malicious data traffic may be related to so called Distributed Denial of Service attack (DDOS) which is a common abuse in the communications networks. The distributed denial of service attack is an attempt to prevent or to impair a legitimate use of a service in the communications network through harnessing a number of network elements to generate and to transmit malicious data to a target address or even from there.

Figure 1:
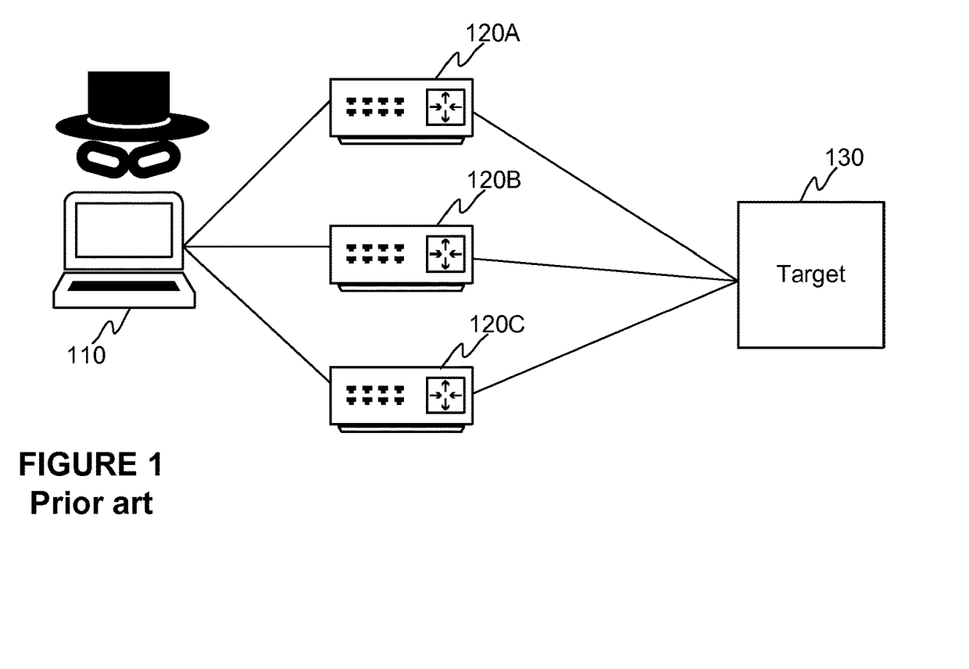
FIG. 1 illustrates schematically an example of a DDOS attack.

In FIG. 1 it is illustrated an example of the DDOS attack in which the attacking party 110 harnesses a plurality of network devices 120A, 120B, 120C to transmit malicious data to the target 130. A non-limiting example of the network device 120A, 120B, 120C may be so-called DNS (Domain Name Service) Resolver. In the manner as illustrated in FIG. 1 it is possible to achieve so-called volumetric DDOS attack because by harnessing a plurality of network devices 120A, 120B, 120C in the task the attack may be amplified and delivered to the target over a plurality of network paths (also called as DDOS vectors). The target 130 shall be understood to a single network device, such as terminal device or a server device, but it may also refer to a sub-network of the communication network, such as a private communication network. As said, FIG. 1 illustrates only one example of DDOS attack, but other types of DDOS attacks exists, such as application layer attacks and protocol attacks.

There are developed some solutions to protect the target 130 from receiving malicious data traffic. This may be arranged by directing the data traffic from the communication network to a cloud service, which is arranged to inspect the received data and if some malicious data traffic is found, it is filter out from the received data and the actual data, i.e. the cleaned data, is delivered to the target 130. Other prior art solutions are based on application level solutions (cf. L7 in OSI model) in which any detection and filtering of the malicious data traffic is performed by an application executing the task in a network device in question, such as in the terminal device.

Generally speaking, the existing solutions for protecting against malicious data traffic are typically based on a monitoring of an amount of data traffic (applying so-called baselining) and/or on a behaviour analysis of network and/or network entities under monitoring. However, the drawback of the existing solutions is that they become unreliable when a network environment changes, such as when new applications/connections are introduced and/or existing applications are disabled and/or a structure of the network changes and/or changes in user accounts, and so on.

Hence, there is need to introduce further solutions to mitigate effects of malicious data traffic in the communication networks.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An object of the invention is to present a method, an apparatus, a computer program product and a system for defending against malicious data carried in a communication network. Another object of the invention is that the method, the apparatus, the computer program product and the system is suitable to remove the malicious data from communication at least in part.

The objects of the invention are reached by a method, an apparatus, a computer program product and a system as defined by the respective independent claims.

According to a first aspect, a method for defending against a malicious data traffic is provided, the method comprises: monitoring, by a defender device, data traffic flowing through a network device; generating a first control signal, by the defender device, in response to a detection that the data traffic comprises a predefined amount of malicious data traffic, to cause a delivery of the data traffic to the defender device; terminating the malicious data traffic in the defender device.

A monitoring of the data traffic may be performed by receiving, by the defender device, a copy of at least one mirrored data packet transported in the data traffic from the network device. For example, the copy of the at least one data packet is received through a monitoring port of the network device.

Moreover, a generation of the first control signal to deliver the data traffic to the defender device may be performed to at least one network device by generating a control frame to the at least one network device, the control frame comprising data indicating a location of an address transformation information for directing the data traffic to the defender device. The at least one network device may e.g. be at least one of: at least one network device arranged to operate on Layer 2, at least one network device arranged to operate on Layer 3, at least one connectivity network, a communication network arranged to operate on Layer 2, a communication network arranged to operate on Layer 3.

Further, the generation of the first control signal may be repeated a number of times.

The method may further comprise: generating, by the defender device, a second control signal to the at least one network device to cancel a delivery of the malicious data traffic to the defender device. A generation of the second control signal may be repeated a number of times.

Alternatively or in addition, the second control signal to cancel the delivery of the malicious data traffic to the defender device may be delivered to the at least one network device in the context of the delivery of the instruction to deliver the data traffic to the defender device, the second control signal to cancel the delivery of the data traffic comprises a definition of a time window the network device is instructed to deliver the data traffic to the defender device.

Furthermore, the defender device may be set hidden by defining a MAC address of the defender device in a manner deviating from a MAC address space reserved for the network devices.

Alternatively or in addition, the defender device may be set hidden by applying a MAC address of another network device as the MAC address of the defender device.

According to a second aspect, a defender device is provided, the defender device comprising: at least one processor; and at least one memory including computer program code; the at least one memory and the computer program code configured to, with the at least one processor, cause the defender device to: monitor data traffic flowing through a network device; generate a first control signal in response to a detection that the data traffic comprises a predefined amount of malicious data traffic, to cause a delivery of the data traffic to the defender device; terminate the malicious data traffic.

The defender device may be arranged to perform a monitoring of the data traffic by receiving a copy of at least one mirrored data packet transported in the data traffic from the network device. For example, the defender device may be arranged to receive the copy of the at least one data packet through a monitoring port of the network device.

The defender device may be arranged to perform a generation of the first control signal to deliver the data traffic to the defender device by generating a control frame to the at least one network device, the control frame comprising data indicating a location of an address transformation information for directing the data traffic to the defender device. For example, the at least one network device to which the defender device is arranged to generate the first control signal may be at least one of: at least one network device arranged to operate on Layer 2, at least one network device arranged to operate on Layer 3, at least one connectivity network, a communication network arranged to operate on Layer 2, a communication network arranged to operate on Layer 3.

Moreover, the defender device may be arranged to repeat the generation of the first control signal in a number of times.

The defender device may further be arranged to: generate a second control signal to the at least one network device to cancel a delivery of the malicious data traffic to the defender device. The defender device may be arranged to repeat a generation of the second control signal in a number of times.

Alternatively or in addition, the defender device may be arranged to deliver the second control signal to cancel the delivery of the malicious data traffic to the defender device to the at least one network device in the context of the delivery of the instruction to deliver the data traffic to the defender device, the second control signal to cancel the delivery of the data traffic comprises a definition of a time window the network device is instructed to deliver the data traffic to the defender device.

Moreover, the defender device may be set hidden by defining a MAC address of the defender device in a manner deviating from a MAC address space reserved for the network devices.

Alternatively or in addition, the defender device may be set hidden by applying a MAC address of another network device as the MAC address of the defender device.

According to a third aspect, a computer program product for defending against a malicious data traffic is provided which, when executed by at least one processor, cause an apparatus to perform the method according to the first aspect.

According to a fourth aspect, a system is provided, the system comprising: a plurality of network devices communicatively connected to each other, and a defender device according to the second aspect.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 2:
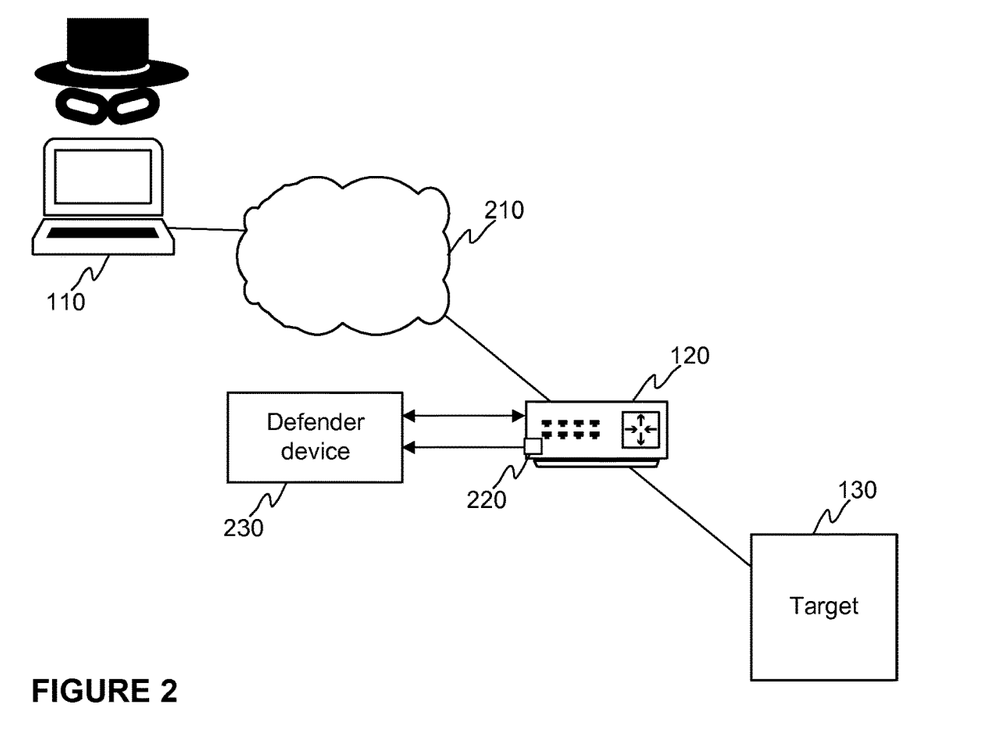
FIG. 2 illustrates schematically a communication system according to an embodiment of the invention.

FIG. 2 illustrates schematically a communication system, or a communication environment, into which a network device called as a defender device 230 may be connected to perform a task providing a protection in the communication path between communicating entities and to entities communicatively connected to the communication network 210. The connection of the defender device 230 to the communication path may e.g. be arranged so that it is not an inline device or a single point of failure device but arranged so that it may transmit control signals either directly or indirectly to one or more network entities in the communication path. For example, the control signals may be transmitted through e.g. an applicable application or client port of the defender device 230 and an access port of the network device 120 (indicated with two-headed arrow between the defender device 230 and the network device 120 in FIG. 2). Further, the defender device 230 may be communicatively connected as a hidden device to the communication path as will be described in the forthcoming description. Moreover, as schematically illustrated in FIG. 2 the defender device 230 is arranged to monitor a network device 120 through an applicable monitoring port 220, such as a mirror port of the network device 120, and, hence, data traffic transported over the network device 120. In accordance with some embodiments of the present invention the defender device 230 may be connected in the communication path by using so-called hidden, or stealth, MAC (media access control) address in order to stay invisible, but operable, to the other entities in the communication path. An advantage of arranging the defender device 230 to be hidden is that other network entities cannot find the defender device 230 e.g. by pinging, or with any similar query or scanning (cf. e.g. ICMP-ping, DNS request, SNMP request, HTTP/HTTPs status request, upnp request, and so on). The hidden MAC address does not correspond to so-called normal MAC address i.e. the MAC address assigned to an application port of the defender device 230 but is imaginary. The term "imaginary" here shall at least to be understood so that a syntax of the hidden MAC address corresponds to the normal MAC address, but the content of the hidden MAC address is selected from an address space not corresponding to any reserved addresses, such as by device manufacturers. In other words, the hidden MAC address is not linked anyhow to so-called electronics of the defender device 230. Hence, attacking the defender device 230 cannot be initiated due to a stealth nature of the device. Even if the defender device 230 is arranged to be hidden normal communication protocols, such as MAC, IP, UDP, or TCP may be applied in the communication.

By summarizing the above given description the defender device 230 is set hidden against the communication path because the mirror port of the network device 120 is not used for transmitting any data, which means that any device, such as the defender device 230, behind the mirror port is not visible to the communication path. Moreover, since the other port of the defender device 230, i.e. the application port, used for the control signals and for terminating the malicious data traffic to the defender device 230 is also set hidden in the above described manner, the defender device 230 is hidden towards the communication path, and towards any network device communicatively connected to the communication path.

The monitored network device 120 may e.g. be a device implementing communication functions on Layer 2 (L2) or on Layer 3 (L3) environment in terms of OSI (Open Systems Interconnection) model. L2 refers to data link layer and L3 refers to network layer in the OSI model and implement corresponding protocols, such as IP. As a non-limiting example, the network device 120 under monitoring may be a switch, a routing device, a firewall, a packet flow system or any similar. In accordance with example embodiments the network device 120 is involved in a transmission of data packets from the communication network 210 to a target entity 130. The target entity 130 may e.g. be a single network device, such as terminal device or a server device, but it may also refer to a separate network from the communication network 210 or a sub-network of the communication network 210, such as a private communication network. In FIG. 2 an attacking party 110 may attack to the target entity 130 by generating either directly or indirectly malicious data to be delivered to the target entity 130 along other data traffic. For example, the attack type caused by the attacking party 110 may be so-called Distributed Denial of Service (DDOS) attack in which the attacking party 110 may harness a plurality of network entities e.g. residing in the communication network 210 e.g. to generate and at least to transmit malicious data to the target entity 130. For sake of clarity it is worthwhile to mention that the defender device 230 may also be arranged to monitor the data traffic from the target entity 130 towards the communication network 210 delivered over the network device 120 under monitoring. It is also worthwhile to mention that the communication path between the communicating entities may comprise a number of network entities through which the data packets of the data traffic may be transported.

Figure 3:
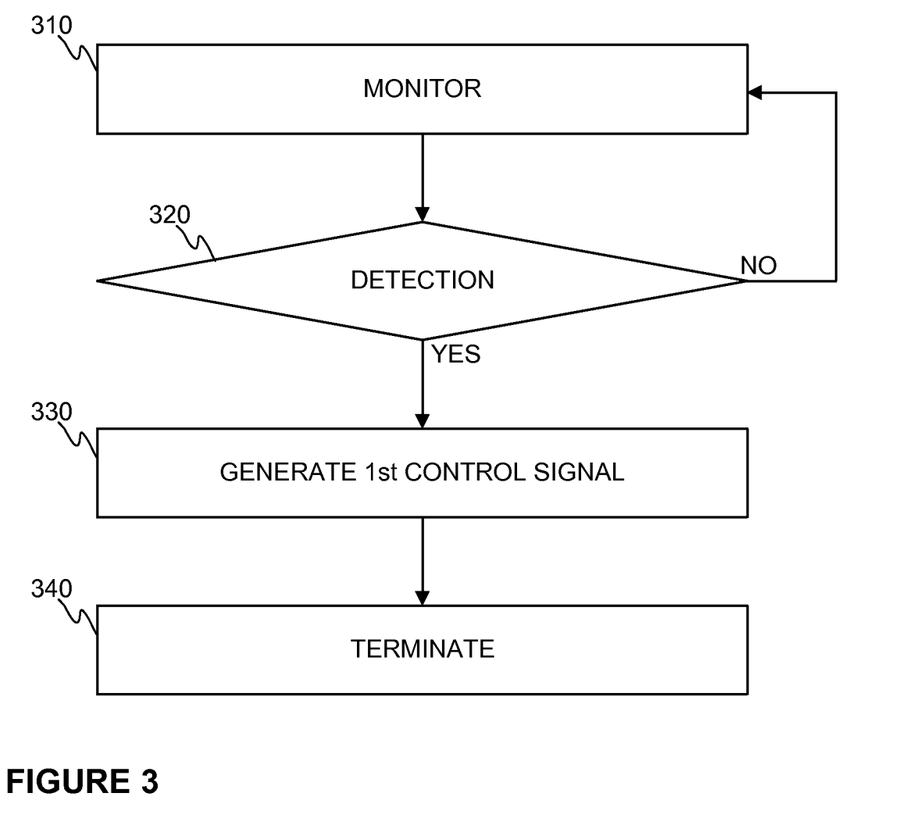
FIG. 3 illustrates schematically a method according to an embodiment of the invention.

Next further aspects are discussed by referring to FIG. 3 illustrating schematically a method according to an example embodiment. At least one objective achieved with the method is to defend against a malicious data traffic carried by the entity monitored by a defender device 230. Hence, the method according to the example embodiment as illustrated in FIG. 3 is described from the defender device 230 point of view. As said, the defender device 230 may be arranged to monitor 310 data traffic flowing through a network device 120. The defender device 230 may be connected in parallel to the data connection and the monitored entity, i.e. the network device 120, therein. The parallel connection may be arranged so that the defender device 230 is arranged to monitor 310, or listen to, the data traffic flowing over the network device 120 through an applicable monitoring port of the network device 120. The applicable monitoring port 220 may e.g. be a mirror port, or any port that mirrors, such as copies, the data packets of the data traffic i.e. performs port mirroring e.g. with so-called switched port analyzer (SPAN) feature especially in devices implementing communication on L2/L3 layers. In case of packet flow system an applicable monitoring port may e.g. be so-called monitor port. In other words, the monitoring may be performed at OSI Layer 2 (MAC data traffic) or at OSI Layer 3 (IP data traffic) or at both. Through the monitoring 310 in the described manner a detection 320 may be performed if the data traffic comprises malicious data or not. The detection may be based on a monitoring of an amount of data traffic (e.g. through the network device 120 under monitoring), a direction of the data traffic, a location of the data traffic in the network, a type of the data traffic (e.g. from one to one, from one to many, from many to one, from many to many), applied protocols, UDP/TCP port numbers, or any combination of these. In some non-limiting examples, the defender device 230 may be arranged to apply machine learning for understanding a typical operation of the communication network, or one or more network devices, it resides to, and a deviation more than allowed may automatically be detected. Still further, in some example embodiments a limit may be set defining an amount of malicious data that is accepted in the data traffic. The limit may e.g. be expressed as a percentage of the total amount of traffic. In other words, if the data traffic comprises malicious data traffic less than allowed, the monitoring 310 may be continued. However, if an outcome of the monitoring 310 is that an amount of malicious data traffic that exceeds the allowed limit is detected 320, further operations may be performed. In accordance with the example embodiment the defender device 230 may be arranged to generate a first control signal, i.e. to instruct, in response to the detection that the data traffic comprises a predefined amount of malicious data traffic, to one or more network devices 120 through which the malicious data traffic is transported to the network device 120 under monitoring to deliver the data traffic to the defender device 230. In other words, the defender device 230 may generate the first control signal also to other network devices than to the monitored network device 120 only. For example, the first control signal may be generated, i.e. composed and transmitted, by applying respective L2/L3 communication protocols to all network devices serving the network operation on a certain layer of the OSI model, such as on Layer 2 or Layer 3. The control signal may be generated concurrently to one or a plurality of network devices. By applying the L2/L3 communication protocols for controlling there is no need to know the destination devices since the control signal is automatically distributed in the communication path in a broadcast manner. In accordance with at least some embodiments of the invention the defender device 230 may have access to data defining the network devices in the communication path in question or the defender device may be arranged to learn a structure of the communication network through machine-learning or by receiving definitions e.g. manually from a user, for example.

Next, some further aspects are described regarding the first control signal. Namely, the first control signal may be generated so that the one or more network devices 120 receive a control frame comprising data indicating a location of an address transformation information for directing the data traffic to the defender device 230. In other words, the defender device 230 instructs the respective network device 120 on a destination address for the data packets in the data traffic to correspond to its own application port defined as the hidden MAC address and, hence, makes itself known in the communication path. Hence, if the network device 120 receiving the first control signal operates on a Layer 2 in the OSI model, e.g. being a L2 switch, the destination address of the protected network device 120 is defined to be a MAC address of the application port of the defender device 230 (i.e. the hidden MAC). In this manner, it is possible to cause the network devices 120 operating on Layer 2 to update so-called Content Addressable Memory (CAM) table and FIB/MAC table (FIB; Forwarding Information Base) accordingly with the new MAC information i.e. the application port of the defender device 230, which cause the malicious data traffic to terminate in the defender device 230. The CAM table is a system memory construct used by Ethernet switch logic which stores information such as MAC addresses available on physical ports with their associated VLAN Parameters. Correspondingly, FIB table is typically used in network bridging, routing, and similar functions to find the proper output network interface to which the input interface should forward a packet. More specifically, a non-limiting example of the control frame for L2 devices for terminating the data traffic in question to the defender device 230 is shown in the table 1 below which may be applied to at least for the following network types: L2 Physical Connectivity Networks (Physical MAC addresses used in connectivity networks), L2 Networks (Physical MAC addresses used in L2 network) or L2 Virtual Connectivity Networks (Virtual MAC addresses used in connectivity networks (e.g. Hot Standby Router Protocol (HSRP) and/or Virtual Router Redundancy Protocol (VRRP) environments):

TABLE 1

(L2 CONTROL FRAME)

| | |
|---|---|
| MAC destination address | FFFFFF FFFFF for all devices or unique device MAC address |
| MAC source address | Virtual MAC address or Physical MAC address (This gives a destination address for the data traffic to be terminated. Hence, a network device operation on a layer L2 applies the information for deciding of a port the MAC address resides and in which port the defender device locates.) |
| ARP R (Reply) | Address Resolution Protocol Opcode = 2 |
| Sender hardware address | Virtual MAC address or Physical MAC address |
| Sender protocol address | Real-or virtual IP address (The IP address being a real pair for the selected MAC address in order to maintain the ARP tables unmodified in the devices operating on L3 layer) |
| Target hardware address | 000000 000000 (not relevant) |
| Target protocol address | 127.0.0.1 (not relevant) |

Hence, the control frame as schematically illustrated in the table 1 above may be delivered by the defender device 230 to all Layer 2 or Layer 3 network devices operating in the respective L2 network, or in VLAN (Virtual Local Area Network) which makes the network devices aware of a location of an address transformation information for directing the data traffic to the defender device 230 in response to the detection of the malicious data traffic as described and when a defend against the malicious data traffic is activated.

Similarly, if the network device 120 receiving the first control signal operates on a Layer 3 in the OSI model, e.g. being a L3 router-switch, the destination address defined by a combined MAC address and IP address is defined to be the application port of the defender device 230. In this manner, it is possible to cause the network devices 120 operating on Layer 2 to update so-called Content Addressable Memory (CAM) table and FIB/MAC table (FIB; Forwarding Information Base) accordingly with the new MAC information as described above. Additionally, an Address Resolution Protocol (ARP) table may be updated with a new IP address and MAC address pair of the defender device 230 in order to cause the data traffic to be sent to the defender device 230 instead of the target entity 130 (cf. to "victim"). For sake of clarity, the Address Resolution Protocol is a communication protocol used for discovering the link layer address, such as a MAC address, associated with a given internet layer address, typically a IPv4 address. This mapping is a critical function in the Internet protocol suite. A non-limiting example of a control frame carried in the first control signal for L3 devices in order to terminate the traffic to the defender device 230 is shown in the table 2 below which may be applied to at least for the following network types: L3 Physical Networks (Physical MAC and IP addresses used in L3 network):

TABLE 2

(L3 CONTROL FRAME)

| | |
|---|---|
| MAC destination address | FFFFFF FFFFF for all devices or unique device MAC address |
| MAC source address | B0B0B0 xxxx01 (hidden MAC address for defender device (i.e. not real MAC of the defender device) |
| ARP R (Reply) | Address Resolution Protocol Opcode = 2 |
| Sender hardware address | B0B0B0 xxxx01 (hidden MAC for defender device (i.e. not real MAC of the defender device) |

TABLE 2-continued (L3 CONTROL FRAME)

| | |
|---|---|
| Sender protocol address | Victim's IP address |
| Target hardware address | FFFFFF FFFFFF for all router devices or unique router MAC address |
| Target protocol address | 127.0.0.1 local IP address or router IP address (Default GW IP address) |

Hence, the control frame as schematically illustrated in the table 2 above may be delivered by the defender device 230 to all Layer 2 or Layer 3 network devices which makes the L3 network devices aware of in the L3 network and in the L2 VLAN network aware of a location of an address transformation information, i.e. MAC/IP address pair or/and CAM-table, for directing the data traffic to the defender device 230 in response to the detection of the malicious data traffic as described and when a defend against the malicious data traffic is activated.

In response to the step 330 in which the defender device 230 is arranged to generate the first control signal as described the malicious data traffic is caused to be directed, or forwarded, to the defender device 230 from at least one network device in question. Hence, the defender device 230 starts receiving data packets of the malicious data traffic in the defined application port of the defender device 230. The defender device 230 is arranged to terminate the malicious data traffic thereto and, in that manner, to remove at least a part of the malicious data traffic from other data traffic transported over the network device 120 under monitoring. In some embodiment of the invention the termination of the data traffic in the defender device 230 may comprise, but is not limited to, storing the received data packets in a memory accessible to the defender device 230 or a deletion of the received data packets from the memory.

Figure 4:
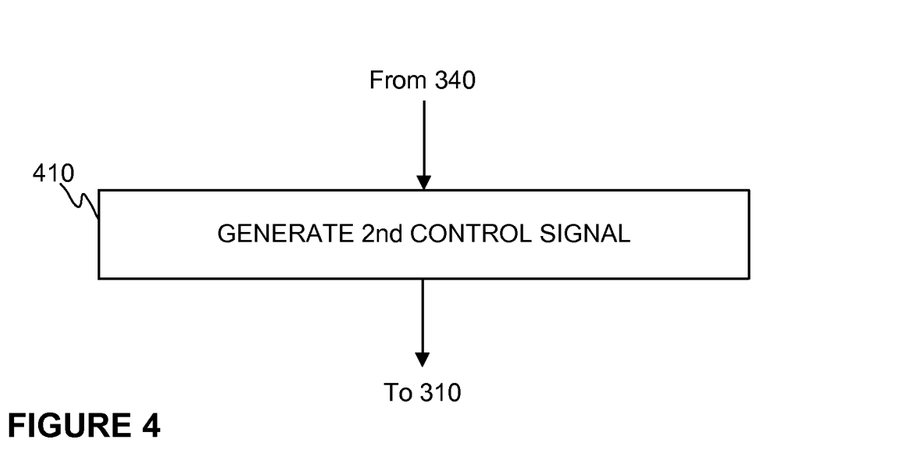
FIG. 4 illustrates schematically further aspects of a method according to an embodiment of the invention.

At some point of time it may be detected in the defender device 230 that the malicious data traffic has ended or that the amount of the malicious data traffic is so small i.e. below a predetermined limit based on which it may be decided that the termination of the malicious data traffic to the defender device 230 may be discontinued. As schematically illustrated in FIG. 4 a discontinuation of the termination of the malicious data traffic to the defender device 230 may be arranged by generating 410 a second control signal by the defender device 230 to one or more network devices 120 as schematically illustrated in FIG. 4. The second control signal may comprise data instructing the respective network devices 120 to return the data traffic between original IP/MAC addresses and the ports of the network devices 120. The original combination of the addresses and the ports may be stored in the respective network devices, which may be taken back into use in response to a receipt of the second control signal. For example, the control frame in the second control signal for L2/L3 networks may be the following:

TABLE 3

L3 COMMAND TO RETURN THE DATA TRAFFIC

| | |
|---|---|
| MAC destination address | FFFFFF FFFFF for all devices or unique device MAC address |
| MAC source address | B0B0B0 xxxx01 (hidden MAC for defender device (i.e. not real MAC of the defender device) |
| ARP R (Reply) | Address Resolution Protocol Opcode = 2 |
| Sender hardware address | Victim's MAC address |
| Sender protocol address | Victim's IP address |
| Target hardware address | FFFFFF FFFFFF for all router devices or unique router MAC address |

TABLE 3-continued

L3 COMMAND TO RETURN THE DATA TRAFFIC

| | |
|---|---|
| Target protocol address | 127.0.0.1 local IP address or unique router IP address (Default GW IP address) |

In response to the generation of the second control signal 410 an operation of the network devices 120 and the defender device 230 may be returned i.e. the data traffic is transported between the network devices 120 and the defender device returns to monitoring state 310. For sake of clarity it is worthwhile to mention that a respecting command to return the data traffic to normal mode may also be performed on L2 layer, but it is not necessary since the data traffic returns to normal path in all network device, such as in switches, in response to the generation of L3 command to return the data traffic.

As mentioned in the foregoing description it may also occur that the target entity 130 may have be ended up to generating data traffic detectable to be malicious by the defender device 230 e.g. in a situation a hijacker has got control over it. Then, the defender device 230, in order to activate the defense, may generate a first control signal comprising the control frame as disclosed in the table 4 below. The control frame may be transmitted to one or more network device 120 operating in layer L2 or L3 and belonging to the network in question. The control frame as schematically illustrated in the table 4 below as a non-limiting example may be applied to at least for L3 Physical Networks (Physical MAC and IP addresses used in L3 network):

TABLE 4

(L3 CONTROL FRAME IF TARGET ENTITY IS THE ATTACKER)

| | |
|---|---|
| MAC destination address | Victim's MAC address (e.g. the target entity 130 if sending malicious data traffic) |
| MAC source address | B0B0B0 xxxx01 (hidden MAC for defender device (i.e. not real MAC of the defender device)) |
| ARP R (Reply) | Address Resolution Protocol Opcode = 2 |
| Sender hardware address | B0B0B0 xxxx01 (hidden MAC for defender device (i.e. not real MAC of the defender device)) |
| Sender protocol address | Default gateway IP address (router's IP address) |
| Target hardware address | Victim's MAC address |
| Target protocol address | Victim's IP address |

In the above described situation that the target entity 130 is actually the source of an outbound malicious data traffic the data traffic may be returned to normal with the control frame as disclosed in a table 5 below. Naturally, such a second control signal is generated in response to a detection that malicious data traffic has ended, or its amount is below a predetermined limit, from the target entity 130.

TABLE 5

(L3 CONTROL FRAME FOR RETURNING DATA TRAFFIC IF TARGET ENTITY IS THE ATTACKER)

| | |
|---|---|
| MAC destination address | Victim's MAC address |
| MAC source address | B0B0B0 xxxx01 (hidden MAC for defender device (i.e. not real MAC of the defender device)) |
| ARP R (Reply) | Address Resolution Protocol Opcode = 2 |
| Sender hardware address | Router's MAC address (Default GW MAC) |
| Sender protocol address | Router's IP address (Default GW IP) |
| Target hardware address | Victim's MAC address |
| Target protocol address | Victim's IP address |

According to another example embodiment the discontinuation of the termination of the malicious data traffic to the defender device 230 may be arranged so that the one or more network devices 120 are provided with further operational parameters relating to the termination of the malicious data traffic. The further operational parameters may define one or more rules to be applied by the one or more network devices 120 which define how the termination of the malicious data traffic is to be implemented. As a non-limiting example, a rule may define a time window for the termination of the malicious data traffic to the defender device 230. In other words, during the time window the one or more network devices 120 may terminate the malicious data traffic to the defender device 230 and when the time window is expired the data traffic may automatically be returned to as it was before the state of the termination. Alternatively or in addition, the operational parameters carried in the first control signal may comprise further rules to be applied by the one or more network devices 120, such as rules affecting other protocols like VRRP, HSRP, BGP and similar protocols.

A further note is hereby given to a generation of the first and the second control signals comprising the respective control frames. Namely, the generation of the control signals may be repeated in a number of times. Especially, the first control signal cause a termination of the data traffic to the defender device 230 may be repeated in a number of times in order to maintain a status and/or to achieve relevant network entities to comply with the defending process. A need to repeat the generation of the first control signal in a number of times may be dependent on a network structure and/or a status of the network. Correspondingly, the generation of the second control signal may be performed in a plurality of times in order to return the network to operate in a normal way.

Figure 5:
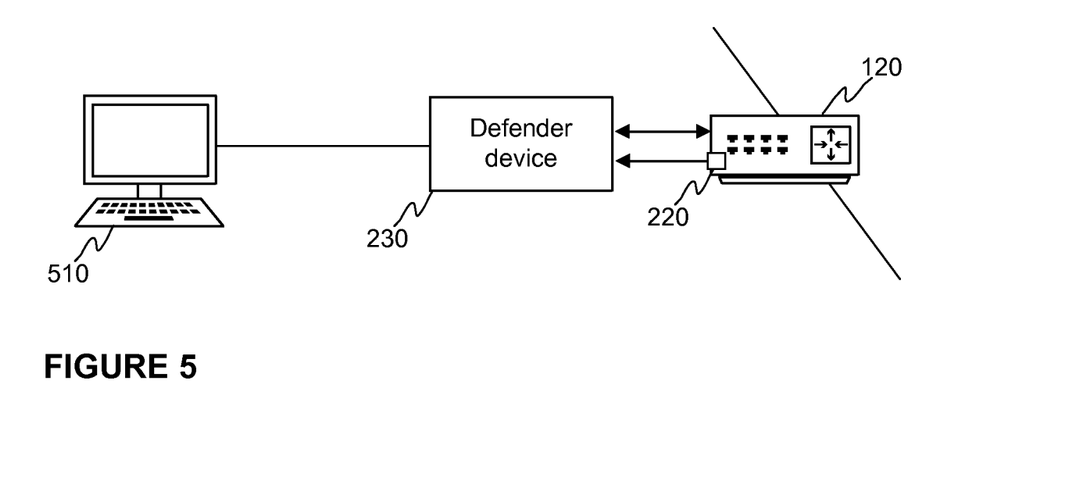
FIG. 5 illustrates schematically further aspects relating to a communication system according to an embodiment of the invention.

FIG. 5 illustrates schematically some further aspects of some example embodiments. Namely, the defender device 230 may be communicatively connected to a control device 510. The control device 510 may correspond to a computing device through which an access at least to control the defender device 230 may be arranged to. Advantageously, the communication connection between the mentioned entities may be arranged with a secure communication connection, such as with a Virtual Private Network (VPN) tunnelling. By establishing the communication connection a configuration of the defender device 230 may be adjusted as well as operations of the defender device 230 may be manually controlled. In some situations, such as if the malicious data traffic is very similar to so-called normal data traffic, a manual intervention is required e.g. through the control device 510.

Figure 6:
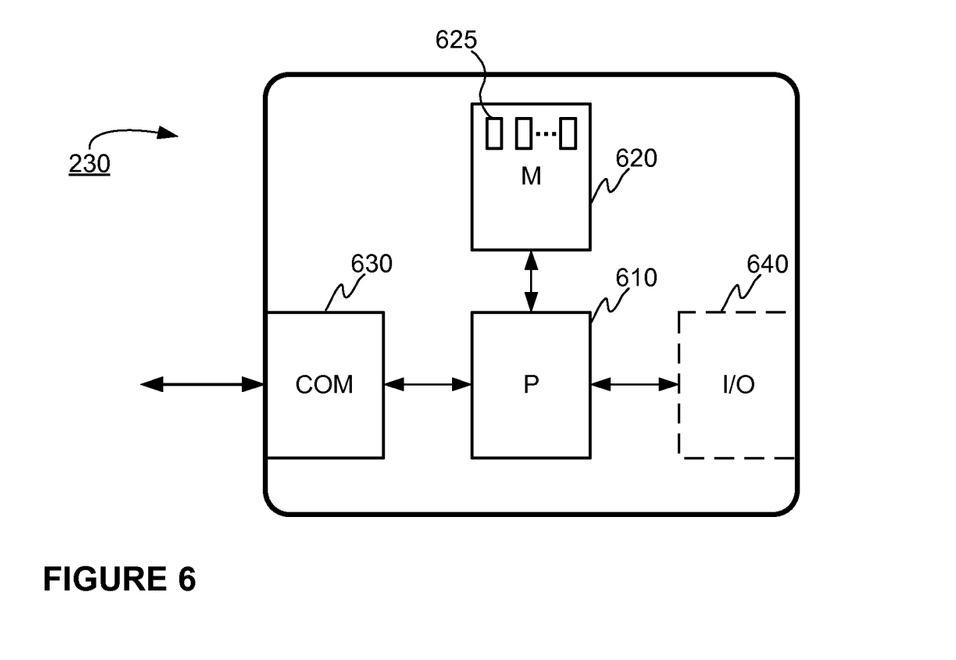
FIG. 6 illustrates schematically a defender device according to an embodiment of the invention.

As discussed herein, at least some aspects of the example embodiments may be achieved with a defender device 230. FIG. 6 illustrates schematically as a block diagram an example of the defender device 230 applicable in the communication environment at least to defend against malicious data traffic. The block diagram of FIG. 6 depicts some components of an apparatus that may be employed to implement the defender device 230. The apparatus may comprise a processor 610 and a memory 620. The memory 620 may store data and computer program code 625. The apparatus may further comprise communication means 630 for wired or wireless communication with other apparatuses, such as the at least one network device 120 under monitoring. Additionally, the apparatus may comprise user I/O (input/output) components 640 that may be arranged, together with the processor 610 and a portion of the computer program code 625, to provide the user interface for receiving input from a user and/or providing output to the user. In particular, the user I/O components 640 may include user input means, such as one or more keys or buttons, a keyboard, a touchscreen or a touchpad, etc. The user I/O components 640 may include output means, such as a display or a touchscreen. In some example embodiments the user I/O components 640 may correspond an external entity, such as a control device 510 as depicted in FIG. 5. The components of the apparatus may be communicatively connected to each other via a communication bus that enables transfer of data and control information between the components.

The memory 620 and a portion of the computer program code 625 stored therein may be further arranged, with the processor 610, to cause the apparatus, i.e. the defender device 230, to perform a method according to an example embodiment as described in the foregoing description. The processor 610 may be configured to read from and write to the memory 620. Although the processor 610 is depicted as a respective single component, it may be implemented as respective one or more separate processing components. Similarly, although the memory 620 is depicted as a respective single component, it may be implemented as respective one or more separate components, some or all of which may be integrated/removable and/or may provide permanent/semi-permanent/dynamic/cached storage.

The computer program code 625 may comprise computer-executable instructions that implement functions that correspond to steps of the method as will be described when loaded into the processor 610. As an example, the computer program code 625 may include a computer program consisting of one or more sequences of one or more instructions. The processor 610 is able to load and execute the computer program by reading the one or more sequences of one or more instructions included therein from the memory 620. The one or more sequences of one or more instructions may be configured to, when executed by the processor 610, cause the apparatus to perform the method according to the example embodiment. Hence, the apparatus may comprise at least one processor 610 and at least one memory 620 including the computer program code 625 for one or more programs, the at least one memory 620 and the computer pro-gram code 625 configured to, with the at least one processor 610, cause the apparatus to perform the method described in the foregoing description.

The computer program code 625 may be provided e.g. a computer program product comprising at least one computer-readable non-transitory medium having the computer program code 625 stored thereon, which computer program code 625, when executed by the processor 610, causes the apparatus to perform the method according to the example embodiment. The computer-readable non-transitory medium may comprise a memory device or a record medium such as a CD-ROM, a DVD, a Blu-ray disc or another article of manufacture that tangibly embodies the computer program. As another example, the computer program may be provided as a signal configured to reliably transfer the computer program.

Still further, the computer program code 625 may comprise a proprietary application, such as computer program code for network monitoring and defending. The proprietary application may be a client application of a service whose server application is running on a server apparatus of the system. The proprietary application may detect an anomaly within the data traffic, identify the malicious data traffic that the anomaly is related to, and automatically generate a service task in order to take actions with respect to the anomaly as described.

For sake of clarity, the implementation of the defender device 230 may be a dedicated standalone device to perform the operation as described above, but it may also be arranged through a distributed solution wherein computing for performing the method as described is shared among a plurality of computing devices.

Some aspects of the present invention may relate to a system comprising a plurality of network devices communicatively connected to each other and a defender device as described in the foregoing description.

In the foregoing description it is referred that the monitoring is performed for detecting malicious data traffic. The term malicious data traffic shall be understood in a broad manner to cover any data traffic defined to be monitored and detected by the defender device 230. Moreover, the data traffic under monitoring and detection may be generated in a context of Denial of Service (DoS) attack or in any other context.

A further note with respect to the invention is that the technique applied in the defender device 230 is suitable for terminating even simultaneously and any direction a plurality of malicious incoming or outgoing data traffic connections transported through the network device 120 under monitoring. In some embodiments the defender device 230 may be arranged to monitor a plurality of network devices 120 concurrently and to operate in the described manner if malicious data traffic is detected. As discussed, the monitored network devices 120 may be implemented in either physical or virtual network environments to work with the defender device 230. Moreover and thus, the defender device 230 is operable in the virtual machine (VM) environment with the virtual device 120.

Moreover, in the foregoing description at least some aspects of the invention as defined in the appended claims are described in such an environment that a defender device 230 is defined to be hidden in the communication path. However, the mechanism in accordance with the present invention may also be applied to even if the defender device 230 is visible in the communication path, i.e. it has a network address, or MAC address, complying with other addresses in the communication path. However, the present invention operates in a more optimal manner if the defender device 230 is not, by default, visible in the communication path, since then the defender device 230 cannot be directly attacked by $3^{rd}$ parties. Besides, even if the defender device 230 is set visible in the communication network, the visibility through applied MAC/IP addresses do not direct to the defender device 230 itself, because the applied MAC/IP addresses are addresses of other network devices, as derivable from the examples of the L2/L3 address tables in the foregoing description. Hence, it means that the defender device 230 itself actually remains invisible in the communication path.

For sake of clarity it is worthwhile to mention that in the foregoing description it is indicated that the defender device 230 is arranged to monitor the network device 120. In accordance with the present invention the term "network device 120" shall be understood in a broad manner to cover at least the following: at least one network device arranged to operate on Layer 2 (OSI model) and implemented either as a physical device or virtually; at least one network device arranged to operate on Layer 3 (OSI model) and implemented either as a physical device or virtually; at least one connectivity network implemented either as a physical network or virtual network; physically implemented communication network arranged to operate on Layer 2 (OSI model); physically implemented communication network arranged to operate on Layer 3 (OSI model).

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for defending against a malicious data traffic, the method comprising:

monitoring, by a defender device, data traffic flowing through at least one network device in a communication path between a communication network and a target entity, the monitoring being performed by receiving a copy of at least one data packet, of a plurality of data packets, transported in the data traffic through a monitoring port of the at least one network device mirroring the plurality of data packets of the data traffic;

generating a first control signal, by the defender device, to the at least one network device through which the data traffic is transported, the first control signal being transmitted through an application or client port of the defender device to an access port of the at least one network device, in response to a detection that the data traffic comprises a predefined amount of malicious data traffic, to cause a delivery of the malicious data traffic to the defender device; and terminating the malicious data traffic in the defender device, wherein the defender device is set hidden by one of: (i) defining a MAC address of the defender device in a manner deviating from a MAC address space reserved for the at least one network device, and (ii) applying a MAC address of another one of the network devices as the MAC address of the defender device.

2. The method of claim 1, wherein a generation of the first control signal to deliver the data traffic to the defender device is performed to the at least one network device by generating a control frame to the at least one network device, the control frame comprising data indicating a location of an address transformation information to direct the data traffic to the defender device.

3. The method of claim 2, wherein the at least one network device is at least one of: at least one network device configured to operate on Layer 2, at least one network device configured to operate on Layer 3, at least one connectivity network, a communication network configured to operate on Layer 2, and a communication network configured to operate on Layer 3.

4. The method of claim 1, wherein a generation of the first control signal is repeated a number of times.

5. The method of claim 1, further comprising:

generating, by the defender device, a second control signal to the at least one network device to cancel a delivery of the malicious data traffic to the defender device.

6. The method of claim 5, wherein a generation of the second control signal is repeated a number of times.

7. The method of claim 5, wherein the second control signal to cancel the delivery of the malicious data traffic to the defender device is delivered to the at least one network device in the context of the delivery of the instruction to deliver the data traffic to the defender device, the second control signal to cancel the delivery of the data traffic comprising a definition of a time window the network device is instructed to deliver the data traffic to the defender device.

8. A defender device, comprising:
  at least one processor; and
  at least one memory including computer program code;
  wherein the at least one memory and the computer program code are configured to, with the at least one processor, cause the defender device to:
    monitor data traffic flowing through a network device in a communication path between a communication network and the network device by receiving a copy of at least one data packet, of a plurality of data packets, transported in the data traffic through a monitoring port of the network device mirroring the plurality of data packets of the data traffic,
    generate a first control signal to at least one network device through which the data traffic is transported, the first control signal being transmitted through an application or client port of the defender device to an access port of the network device in response to a detection that the data traffic comprises a predefined amount of malicious data traffic, to cause a delivery of the malicious data traffic to the defender device, and
    terminate the malicious data traffic,
  wherein the defender device is set hidden by one of: (i) defining a MAC address of the defender device in a manner deviating from a MAC address space reserved for the network device, and (ii) applying a MAC address of another network device as the MAC address of the defender device.

9. The defender device of claim 8, wherein the defender device is configured to perform a generation of the first control signal to deliver the data traffic to the defender device by generating a control frame to the at least one network device, the control frame comprising data indicating a location of an address transformation information to direct the data traffic to the defender device.

10. The defender device of claim 9, wherein the at least one network device to which the defender device is configured to generate the first control signal is at least one of: at least one network device configured to operate on Layer 2, at least one network device configured to operate on Layer 3, at least one connectivity network, a communication network configured to operate on Layer 2, and a communication network configured to operate on Layer 3.

11. The defender device of claim 8, wherein the defender device is configured to repeat the generation of the first control signal a number of times.

12. The defender device of claim 8, wherein the defender device is further configured to:
  generate a second control signal to the at least one network device to cancel a delivery of the malicious data traffic to the defender device.

13. The defender device of claim 12, wherein the defender device is configured to repeat a generation of the second control signal a number of times.

14. The defender device of claim 12, wherein the defender device is configured to deliver the second control signal, to cancel the delivery of the malicious data traffic to the defender device, to the at least one network device in the context of the delivery of the instruction to deliver the data traffic to the defender device, the second control signal to cancel the delivery of the data traffic comprising a definition of a time window the network device is instructed to deliver the data traffic to the defender device.

15. A computer program product comprising at least one non-transitory computer-readable storage medium having computer-executable program code instructions stored therein, the program code instructions being configured, when the computer program product is executed on a computer, to cause the computer to at least:
  monitor data traffic flowing through at least one network device in a communication path between a communication network and a target entity by receiving a copy of at least one data packet, of a plurality of data packets, transported in the data traffic through a monitoring port of the at least one network device mirroring the plurality of data packets of the data traffic;
  generate a first control signal to the at least one network device through which the data traffic is transported, the first control signal being transmitted through an application or client port of the defender device to an access port of the at least at one network device, in response to a detection that the data traffic comprises a predefined amount of malicious data traffic, to cause a delivery of the malicious data traffic to the defender device; and
  terminate the malicious data traffic,
  wherein the defender device is set hidden by one of: (i) defining a MAC address of the defender device in a manner deviating from a MAC address space reserved for the at least one network device, and (ii) applying a MAC address of another one of the network devices as the MAC address of the defender device.

16. A system, comprising:
  a plurality of network devices communicatively connected to each other; and
  a defender device comprising:
    at least one processor, and
    at least one memory including computer program code,
    the at least one memory and the computer program code configured to, with the at least one processor, cause the defender device to:
      monitor data traffic flowing through at least one of the network devices in a communication path between a communication network and a target entity by receiving a copy of at least one data packet, of a plurality of data packets, transported in the data traffic through a monitoring port of the at least one network device mirroring the plurality of data packets of the data traffic,
      generate a first control signal to the at least one network device through which the data traffic is transported, the first control signal being transmitted through an application or client port of the defender device to an access port of the at least at one network device, in response to a detection that the data traffic comprises a predefined amount of malicious data traffic, to cause a delivery of the malicious data traffic to the defender device, and
      terminate the malicious data traffic,
    wherein the defender device is set hidden by one of: (i) defining a MAC address of the defender device in a manner deviating from a MAC address space reserved for the at least one network device, and (ii) applying a MAC address of another one of the network devices as the MAC address of the defender device.

* * * * *